United States Patent
Heibel et al.

(10) Patent No.: US 12,183,473 B2
(45) Date of Patent: Dec. 31, 2024

(54) METHOD OF MAGNETICALLY REMOVING AN IRRADIATED CAPSULE FROM A BURNABLE ABSORBER RODLET

(71) Applicant: Westinghouse Electric Company LLC, Cranberry Township, PA (US)

(72) Inventors: Michael D. Heibel, Broomfield, CO (US); Cory Hildebrand, Mount Pleasant, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 18/485,439

(22) Filed: Oct. 12, 2023

(65) Prior Publication Data
US 2024/0120119 A1      Apr. 11, 2024

Related U.S. Application Data

(62) Division of application No. 17/356,309, filed on Jun. 23, 2021, now Pat. No. 11,817,223.

(51) Int. Cl.
| | |
|---|---|
| *G21C 19/32* | (2006.01) |
| *G21C 7/04* | (2006.01) |
| *G21C 19/19* | (2006.01) |
| G21C 3/326 | (2006.01) |
| G21C 19/02 | (2006.01) |
| G21C 23/00 | (2006.01) |
| G21G 1/02 | (2006.01) |

(52) U.S. Cl.
CPC ............... *G21C 19/32* (2013.01); *G21C 7/04* (2013.01); *G21C 19/19* (2013.01); *G21C 3/326* (2013.01); *G21C 19/02* (2013.01); *G21C 23/00* (2013.01); *G21G 1/02* (2013.01)

(58) Field of Classification Search
CPC .......... G21C 19/32; G21C 19/19; G21C 7/04; G21C 19/02; G21C 23/00; G21C 3/326; G21G 1/02
USPC .................................................. 376/260, 419
See application file for complete search history.

(56) References Cited

U.S. PATENT DOCUMENTS

| | | |
|---|---|---|
| 4,650,606 A | 3/1987 | Yamamoto |
| 9,330,798 B2 | 5/2016 | Dayal et al. |
| 11,342,083 B2 | 5/2022 | Brun et al. |

FOREIGN PATENT DOCUMENTS

| | | |
|---|---|---|
| CA | 3113627 A1 | 6/2021 |
| CN | 111937087 A | 11/2020 |
| FR | 2534732 A1 | 4/1984 |
| JP | 3438954 B2 | 8/2003 |

(Continued)

OTHER PUBLICATIONS

International Search Report and Written Opinion for International PCT Application No. PCT/US2021/042800, dated Mar. 18, 2022.

(Continued)

*Primary Examiner* — Jack W Keith
*Assistant Examiner* — Daniel Wasil
(74) *Attorney, Agent, or Firm* — K&L Gates LLP

(57) ABSTRACT

A method of removing an irradiated capsule from inside of a burnable absorber rodlet. The capsule can contain produced Co-60. The method includes inducing an electromagnetic flux into the capsule to magnetically lock the capsule with a capsule removal module. While locked, the capsule can be relatively moved along a longitudinal axis of the rodlet to remove the capsule from the rodlet.

6 Claims, 8 Drawing Sheets

(56) References Cited

FOREIGN PATENT DOCUMENTS

TW  I591647 B  7/2017
WO  2021076673 A1  4/2021

OTHER PUBLICATIONS

Search Report for corresponding Taiwan Application No. 111123361, mailed Sep. 12, 2023 (English Translation).

METHOD OF MAGNETICALLY REMOVING AN IRRADIATED CAPSULE FROM A BURNABLE ABSORBER RODLET

CROSS-REFERENCE TO RELATED APPLICATIONS

The present application is a divisional application claiming priority under 35 U.S.C. § 121 to U.S. patent application Ser. No. 17/356,309, entitled DEVICE FOR MAGNETICALLY REMOVING A CAPSULE CONTAINING CO-60 FROM A BURNABLE ABSORBER RODLET, filed Jun. 23, 2021, now U.S. Pat. No. 11,817,223, issued Nov. 14, 2023, which is incorporated by reference herein in its respective entirety.

BACKGROUND

Cobalt-60 (Co-60) is a synthetically produced radioactive isotope used in a plurality of industrial applications such as sterilization of medical equipment. A nuclear reactor may employ Co-59 as a burnable absorber in a reactor core to stabilize the fission reaction and Co-60 may be produced as a by-product of a nuclear reactor operation. Like other burnable absorbers in a nuclear reactor, Co-59 absorbs excess neutrons during the early stages of a fission reaction ensuring that a fissile material provides a consistent burnup through the duration of a nuclear reactor operation cycle. During the nuclear reactor operation, Co-59 transmutes into radioactive Co-60. After a predetermined duration or number of operation cycles, Co-60 capsules within the burnable absorber rodlets reach a state of equilibrium and can no longer absorb excess neutrons. The radioactive Co-60 may be removed from the nuclear reactor and used in industrial applications.

SUMMARY

In various aspects, the present disclosure describes an apparatus for removing irradiated burnable absorber (BA) capsules, the apparatus comprising: a control arm; a BA capsule removal module supported by the control arm and positionable by the control arm around a BA rodlet, wherein the BA rodlet comprises a paramagnetic cladding material disposed about an outer surface of the BA rodlet; wherein the BA capsule removal module defines a capsule removal tunnel configured to be slidably positioned around a BA rodlet wherein the capsule removal tunnel defines first and second tunnel openings at corresponding first and second ends of the capsule removal tunnel, and wherein the first and second tunnel openings define a distal radius $R_1$ that linearly tapers to a smaller inner radius $R_2$; wherein the BA capsule removal module comprises: a plurality of bearing columns equidistantly spaced in the capsule removal tunnel, wherein the bearing columns comprise bearings configured to contact a BA rodlet positioned inside the capsule removal tunnel, and wherein the capsule removal module is slidably movable along a longitudinal axis of by the BA rodlet; and a solenoid positioned around the capsule removal tunnel and configured to electrically induce an electromagnetic flux in a BA capsule comprising a ferromagnetic material, wherein the electromagnetic flux locks the ferromagnetic BA capsule to the BA capsule removal module, wherein axial movement of the BA capsule removal module positioned outside of the BA rodlet results in the axial movement of the BA capsule inside of the BA rodlet.

In various aspects, the present disclosure describes a method for removing irradiated burnable absorber capsules from a plurality of burnable absorber rodlets, the method comprising: securing, by a rodlet positioning module, a first burnable absorber (BA) rodlet to a rodlet positioning control arm, wherein the rodlet positioning module is supported by the rodlet positioning control arm; disconnecting, by a cutting module, the first BA rodlet from a burnable absorber assembly, wherein the burnable absorber assembly comprises the plurality of BA rodlets connected by a hold-down plate in a predetermined array, and wherein the cutting module is configured to cut the first BA rodlet at the point where it connects to the hold-down plate; positioning, by a BA capsule removal control arm, BA capsule removal module around the BA rodlet, wherein the BA capsule removal module is supported by the BA capsule removal control arm; selecting, by the BA capsule removal module, a first BA capsule for removal; inducing, by the BA capsule removal module, an electromagnetic flux into the first BA capsule comprising a ferromagnetic material, wherein the electromagnetic flux locks the first ferromagnetic BA capsule in parallel with the BA capsule removal module; leveraging, by the rodlet positioning module, the position of the BA rodlet relative to the BA capsule removal module, wherein the applied leverage by the rodlet positioning module allows the BA capsule removal module to move the BA capsule in along a longitudinal axis; aligning, by the rodlet positioning module, the position of the BA rodlet over a first vacant storage slot in a capsule storage cage; and depositing, by the capsule removal module, the BA capsule into the first vacant storage slot of the capsule storage cage.

In yet another aspect, the present disclosure describes a system for removing irradiated burnable absorber (BA) capsules from a plurality of burnable absorber rodlets, the system comprising: a control circuit communicably coupled to a rodlet positioning module, a cutting module, and one or more BA capsule removal modules; the control circuit comprises at least one processor, and configured to: secure, by the rodlet positioning module, a first BA rodlet to the rodlet positioning module; position, a first BA capsule removal module around the BA rodlet; remove, by the cutting module, the first BA rodlet from a BA assembly, wherein the first BA rodlet comprises a plurality of BA capsules; select, by the first BA capsule removal module, a first BA capsule from a plurality of BA capsules; induce, by the first BA capsule removal module, an electromagnetic flux into the first BA capsule comprising a ferromagnetic material, wherein the electromagnetic flux locks the first ferromagnetic BA capsule in parallel with the first BA capsule removal module; remove, by the cutting module, a bullet nose plug from the first BA rodlet; leverage, by the rodlet positioning module, the position of the first BA rodlet relative to the first BA capsule removal module, wherein the applied leverage by the rodlet positioning module allows the first BA capsule removal module to move the first BA capsule in along a longitudinal axis; align, by the rodlet positioning module, the first BA rodlet over a first vacant storage slot in a capsule storage cage; and deposit, by the first BA capsule removal module, the first BA capsule into the first vacant storage slot of the capsule.

DETAILED DESCRIPTION

The present disclosure describes various aspects for safely removing a plurality of irradiated burnable absorber capsules from a plurality of burnable absorber rodlets. In one aspect of the present disclosure, cobalt-59 isotopes (Co-59) are encapsulated into AC339 capsules and a plurality of Co-59 capsules are arranged in a stack orientation in cobalt burnable absorber (COBA) rodlets. The plurality of COBA rodlets are irradiated in a nuclear reactor which simultaneously benefits the nuclear reactor operation and the cobalt capsules. During the nuclear reactor operation, the Co-59 burnable absorber capsules absorb excess neutrons that are emitted during early stages of the fission reaction. Absorbing excess neutrons provides a consistent burnup of the fissile material and simultaneously transmutes Co-59 to radioactive Co-60. Once Co-60 reaches a state of equilibrium, it no longer absorbs excess neutrons, and has reached the end of its useful life in the nuclear reactor. The radioactive Co-60 capsules may be recycled and sold as a valuable compound in industrial applications. However, in order to resell the Co-60 capsules, they must be removed from the COBA rodlets.

The present disclosure describes various aspects for the safe removal of radioactive Co-60 capsules from burnable absorber (BA) rodlets after they are irradiated in a nuclear energy reactor. One issue that may arise in the removal process is due to the various forces acting on the capsules within the rodlet. Burnable absorber (BA) capsules may become stuck or lodged within the BA rodlets from corrosion or bent and warped rodlets. Additionally, the BA capsules are removed while the rodlets are submersed in a spent rod pool and the water may create backpressure within the rodlet. Finally, even in situations when the capsules may be easily removed, the capsules are still subject to gravity and may risk falling out of the rodlet when the bottom bullet nose plug is removed from the BA capsule.

The present disclosure describes a ferromagnetic capsule removal device configured to lock on to a BA capsule positioned within a BA rodlet and extract the capsule in a controlled manner. In various aspects, the ferromagnetic lock is configured to overcome at least the forces of corrosion, friction, gravity, or backpressure, or any combination thereof.

Figure 1:
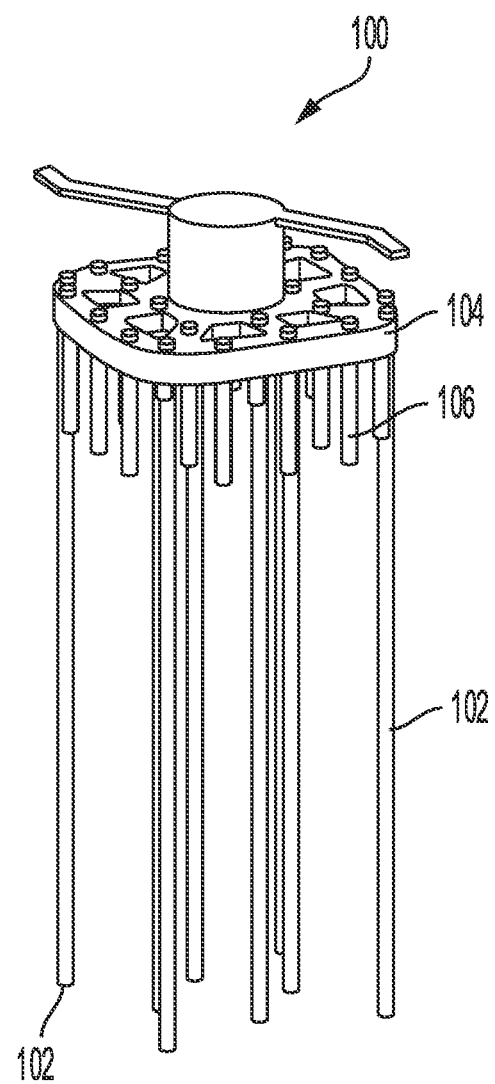
FIG. 1 shows a detailed view of a burnable absorber assembly comprising a plurality of burnable absorber rodlets connected to a hold-down plate, in accordance with at least one aspect of the present disclosure.
Figure 2:
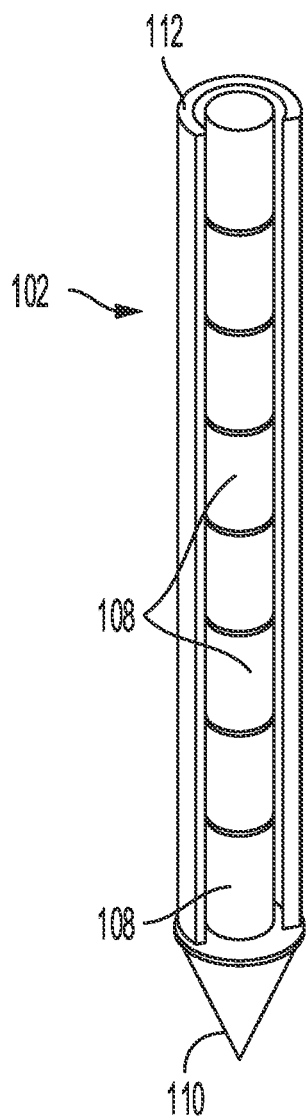
FIG. 2 shows a cutaway view of a burnable absorber rodlet comprising a plurality of burnable absorber capsules, in accordance with at least one aspect of the present disclosure.

FIG. 1 shows a detailed view of a burnable absorber assembly 100 comprising a plurality of BA rodlets 102 connected to a hold-down plate 104. FIG. 2 shows a cutaway view of a burnable absorber rodlet 102 comprising a plurality of burnable absorber capsules 108, in accordance with at least one aspect of the present disclosure. The plurality of BA rodlets 102 further comprises a plurality of burnable absorber capsules 108 in a stacked configuration, a rodlet cladding 112, and a bullet nose plug 110. In an aspect, the rodlet cladding 112 may comprise a paramagnetic or superparamagnetic material such as a zirconium alloy, whereas the BA capsules may comprise a ferromagnetic material such as cobalt. In the present aspect, the BA assembly 100 comprises eight BA rodlets 102 and 16 stainless steel thimbles 106 connected to the hold-down plate 104. The stainless steel thimbles 106 occupy vacant positions on the hold-down plate 104 that may be optionally configured with additional BA rodlets.

Figure 3:
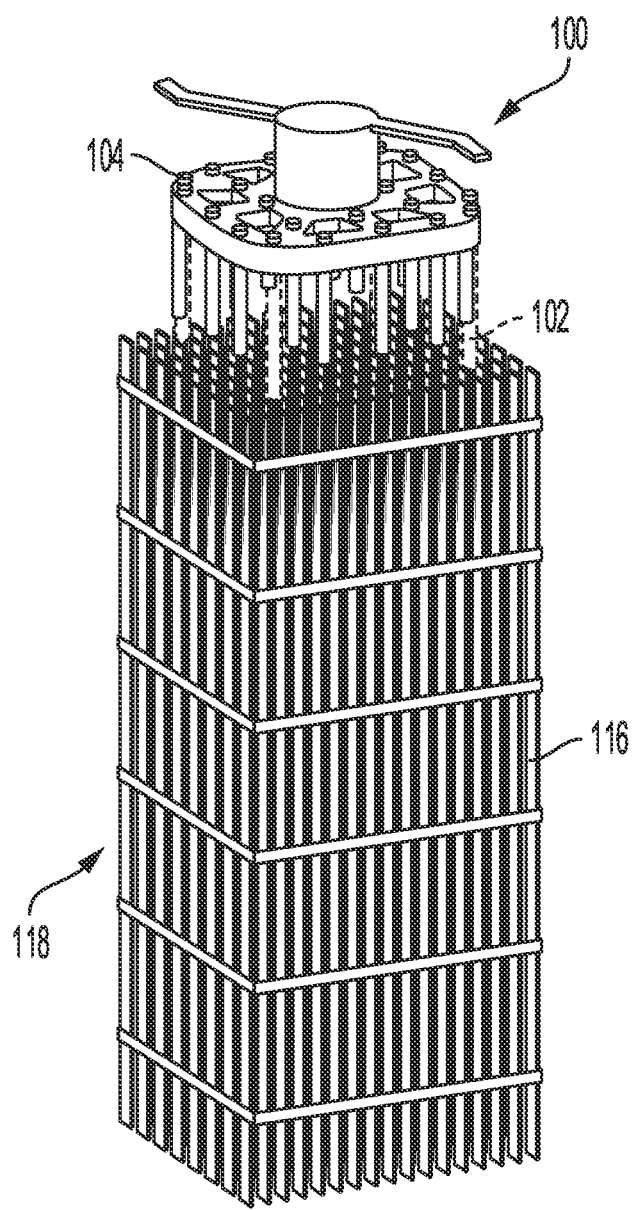
FIG. 3 shows a burnable absorber assembly inserted into a fuel rod bundle, in accordance with at least one aspect of the present disclosure.
Figure 4:
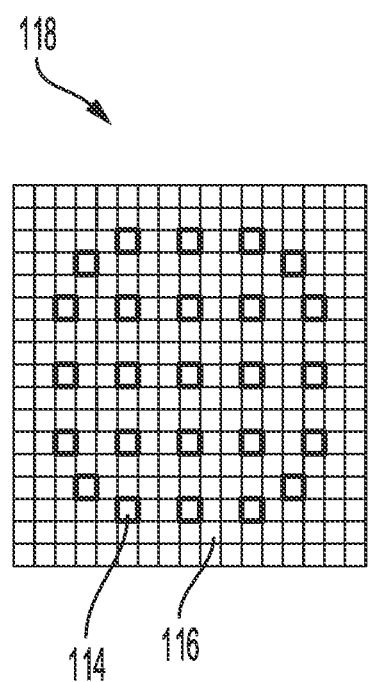
FIG. 4 shows a top view of a fuel rod bundle, in accordance with at least one aspect of the present disclosure.

FIG. 3 shows a burnable absorber assembly 100 inserted into a fuel rod bundle 118, and FIG. 4 shows a top view of the fuel rod bundle 118. At various stages of a nuclear reactor operation, a burnable absorber assembly 100 is configured such that the BA rodlets 102 may absorb the excess neutrons emitted by the fuel rods 116. The fuel rod bundle 118 is configured with burnable absorber channels 114 to slidably receive the burnable absorbers rodlets 102 into the fuel rod bundle 118

Figure 5:
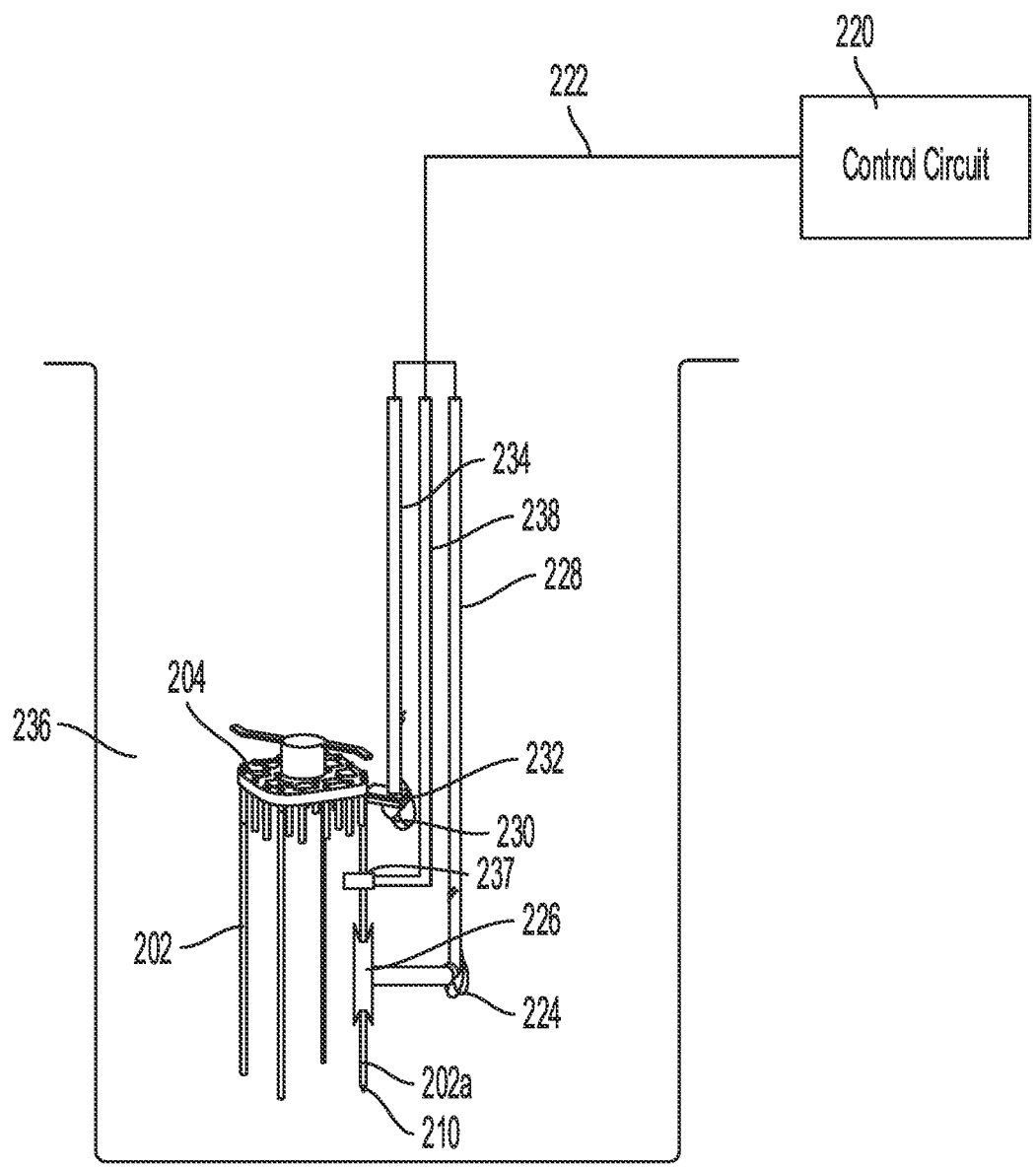
FIG. 5 shows a burnable absorber assembly submersed in a spent rod pool where the burnable absorber capsules are removed from the burnable absorber rodlets, in accordance with at least one aspect of the present disclosure.

FIG. 5 shows a burnable absorber assembly 200 submersed in a spent rod pool 236 where the burnable absorber capsules are removed from the burnable absorber rodlets 202, in accordance with at least one aspect of the present disclosure. The spent rod pool 236 comprises water to cool the spent rods and provide shielding from the radiation that emanate from the burnable absorber rodlets 202. In this aspect, a first burnable absorber rodlet 202a may be selected by a control circuit 220 to remove the burnable absorber capsules removed from the selected burnable absorber rodlet 202a. In one aspect the control circuit 220 comprising at least one processor and a memory coupled to the at least one processor, the memory storing instructions that are executable by the at least one processor to control the removal of the burnable absorber capsules from the burnable absorber rodlets 202. In another aspect, the control circuit 220 comprises at least one logic circuit that may be implemented in hardware such as a field programmable gate array (FPGA) to control the removal of the burnable absorber capsules from the burnable absorber rodlets 202.

In one aspect, the control circuit 220 is configured to control a plurality of modules 226, 237, 232 and their respective control arms 228, 238, 234. The modules include a cutting module 232, a rodlet positioning module 237, and a burnable absorber capsule removal module 226. The cutting module 232 is configured to cut the burnable absorber rodlet from the burnable absorber assembly 200 and cut the bullet nose plug 210 on one end of the BA rodlet 202a. Removing the bullet nose plug 210 provides access to the burnable absorber capsules stored within the BA rodlet 202a. The BA removal module 226 and the rodlet positioning module 237 are configured to work in tandem to remove the BA capsules from the BA rodlet 202a. A BA capsule may have one or more forces acting on it. In one aspect, the only force acting on the BA capsules is gravity and the BA removal module is configured to hold the BA capsules in place while the bullet nose plug 210 is removed, and prevent the BA capsules from falling out of the BA rodlet 202a before the BA rodlet 202a can be properly aligned with a capsule cage.

In another aspect, a plurality of countervailing forces may act on the BA capsule preventing the BA capsule from being easily removed from the BA rodlet 202a. In this aspect, the control circuit 220 determines the forces acting on the BA capsules within the BA rodlet 202a and determines the amount of current required to induce an electromagnetic flux into a BA capsule to lock the BA capsule in parallel with the capsule removal module 226. The control circuit 220 determines the amount of current required to "lock" the BA capsule based on the relative forces acting on the rodlet positioning module and the BA capsule removal module 226. Forces acting on the BA capsules within the BA rodlet 202a may be measured by a one or more than one force sensor, such as a strain gauge, electrically coupled to the control circuit 220.

In the illustrated example, the control circuit 220 configures the BA rodlet positioning module 237 to secure or hold the BA rodlet 202a in a static position relative to the BA capsule removal module 226. The control circuit 220 configures the BA capsule removal module 226 to select a BA capsule within the BA rodlet 202a, and configures the BA removal module 226 to induce an electromagnetic flux via a solenoid. The control circuit 220 provides a command to the BA capsule removal module 226 to move the BA capsule along a longitudinal axis of the BA rodlet 202a. This movement is effectuated by the removal control arm 228. The BA capsule removal module 226 may communicate the force relative to the rodlet positioning module 237 to the control circuit 220. In one aspect, force may be measured by monitoring the electrical current drawn by the BA capsule removal module 226 or by strain gauges located on the BA capsule removal module 226. Based on this feedback communication, the control circuit 220 may modulate the current provided to the BA capsule removal module 226 necessary to "lock" the BA capsule in parallel with the BA capsule removal module 226. The control circuit 220 may be operated directly by a technician in a manual operation mode or the control circuit may operate in an automatic operation mode.

In the automatic operation mode, the control circuit 220 receives feedback communications from the BA capsule removal module 226, rodlet positioning module 237, and the cutting module 232. The control circuit 220 may be encoded with a set of predetermined instructions to operate the plurality of modules 226, 237, 232 based on the feedback communications provided by the plurality of modules 226, 237, 232.

Description of the Burnable Absorber Capsule Removal Module

Figure 6:
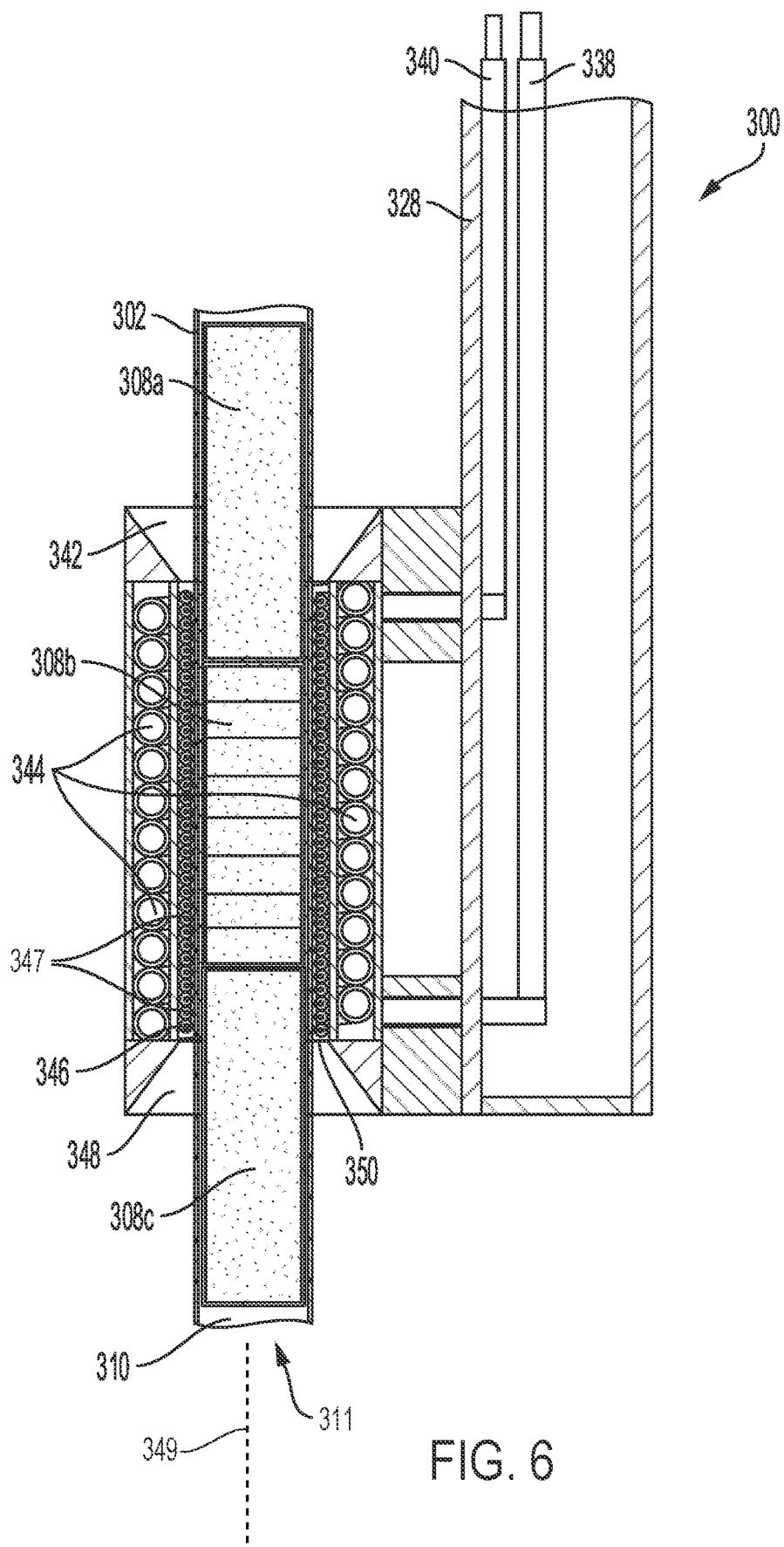
FIG. 6 shows a section view of a burnable absorber capsule removal module, in accordance with at least one aspect of the present disclosure.

FIG. 6 shows a section view of a burnable absorber capsule removal module 300, in accordance with at least one aspect of the present disclosure. The burnable absorber capsule removal module 300 comprises a capsule removal tunnel 350, a first tunnel opening 342, a second tunnel opening 348, a plurality of roller bearing columns 346 and a solenoid 344. The first tunnel opening 342 tapers from a larger distal radius $R_1$ to a smaller inner radius $R_2$ that guides the BA rodlet 302 to be positioned into the capsule removal tunnel 350. The roller bearing columns 346 are equidistantly spaced on the interior wall of the capsule removal tunnel 350. The array of roller bearings 347 are configured to contact the exterior cladding of BA rodlet 302 and guide the burnable absorber capsule removal module 300 to move along a longitudinal axis 349 of the BA rodlet 302. In one aspect, the BA rodlet 302 is in a fixed position relative to the burnable absorber capsule removal module 300. This allows the burnable absorber capsule removal module 300 to remove the capsule at the bottom of the BA rodlet 302.

The solenoid 344 is communicably coupled to the control circuit 320, and the solenoid 344 is configured to induce an electromagnetic flux in BA capsule 308b. The electromagnetic flux "locks" BA capsule 308b in parallel with BA capsule removal module 300. Solenoid 344 may be configured to only induce an electromagnetic flux in one BA capsule at a time. If the solenoid 344 induces an electromagnetic flux in the BA capsule 308b, it may not induce an electromagnetic flux in the BA capsules 308a, 308c. The BA capsule removal module 300 may move along the longitudinal axis 349 to control the lowest relative BA capsule 308c. In one aspect, the BA capsule 308c is positioned closest to one end 311 of the BA rodlet 302 where the bullet nose plug 310 is removed and may be the first BA capsule removed from the BA rodlet 302. Following the removal of the BA capsule 308c, the BA capsule removal module is configured by the control circuit 322 to move in the along the longitudinal axis to the next BA capsule 308b.

The BA capsule removal module 300 is configured to lock onto a BA capsule with an electromagnetic field generated by the solenoid 344 and move the BA capsule in unison with the BA removal module movement. In one aspect, a plurality of forces are exerted on the BA capsule preventing the BA capsule from being removed. In this aspect, the control circuit 322 configures the rodlet positioning module 237 (FIG. 2), to hold the BA rodlet and configures the BA capsule removal module to move along the longitudinal axis towards the opening 310 of the BA rodlet. The control circuit 322 coordinates a relative amount of force between the rodlet positioning module and the BA capsule removal module to overcome the exerted forces on the BA capsule and remove the BA capsule.

In another aspect, a plurality of BA removal modules may concurrently control a plurality of BA capsules. As the lowest BA capsule is removed from the BA rodlet, control of the next BA capsule to be removed is transferred to the lowest BA capsule removal module and the process continues until all BA capsules are removed from the BA rodlet.

Figure 7:
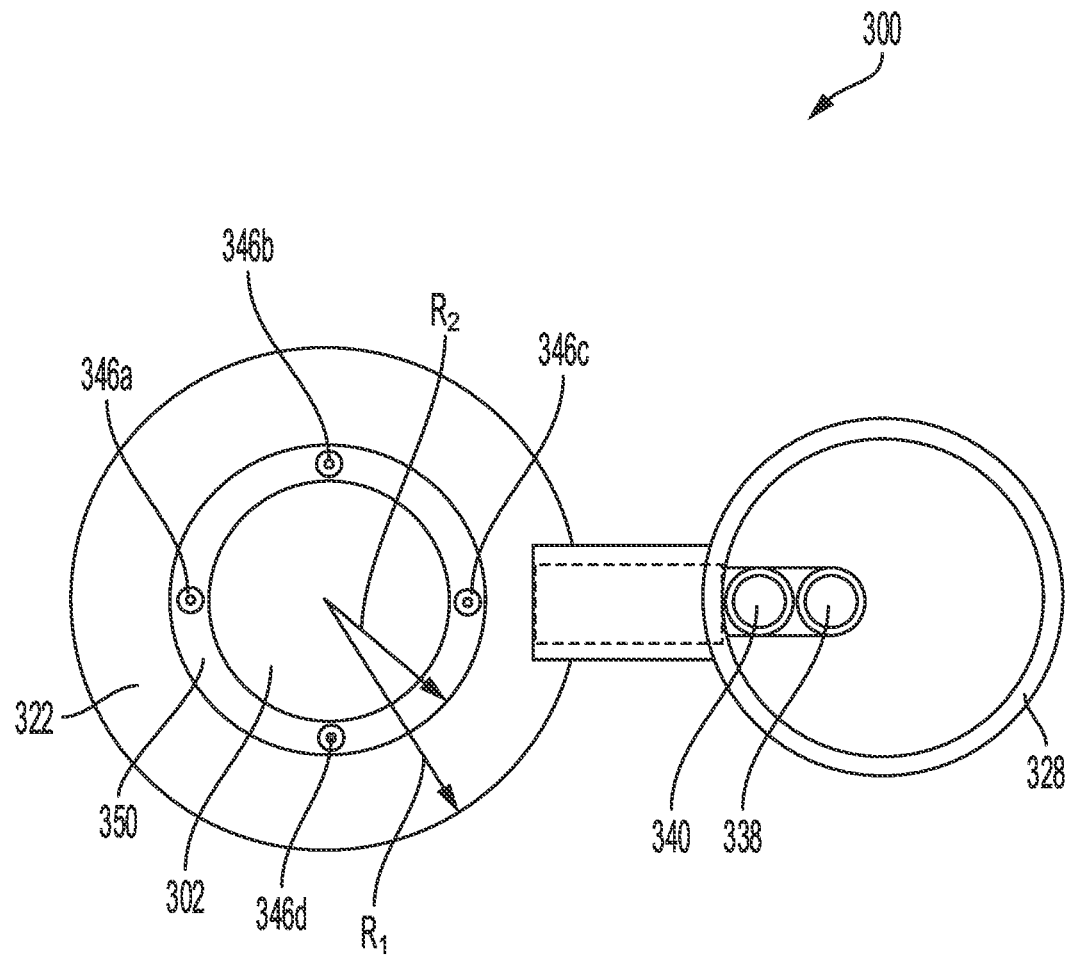
FIG. 7 shows a top view of a burnable absorber capsule removal module connected to the burnable absorber removal module control arm, in accordance with at least one aspect of the present disclosure.

FIG. 7 shows a top view of a burnable absorber capsule removal module 300 connected to the burnable absorber removal module control arm 328, in accordance with at least one aspect of the present disclosure. The burnable absorber capsule removal module 300 comprising a plurality of roller bearing columns 346a-d and a first funnel opening 322. In the present aspect, there are four roller bearing columns 346a-d, where roller bearing column 346a is positioned across from the roller bearing column 346c, and the roller bearing column 346b is positioned across from the roller bearing column 346d. In various aspects, at least three equidistantly spaced roller bearing columns are used to center the burnable absorber rodlet within the interior of the capsule removal tunnel 350 and allows the BA capsule removal module to be reposition near a BA capsule.

Figure 8:
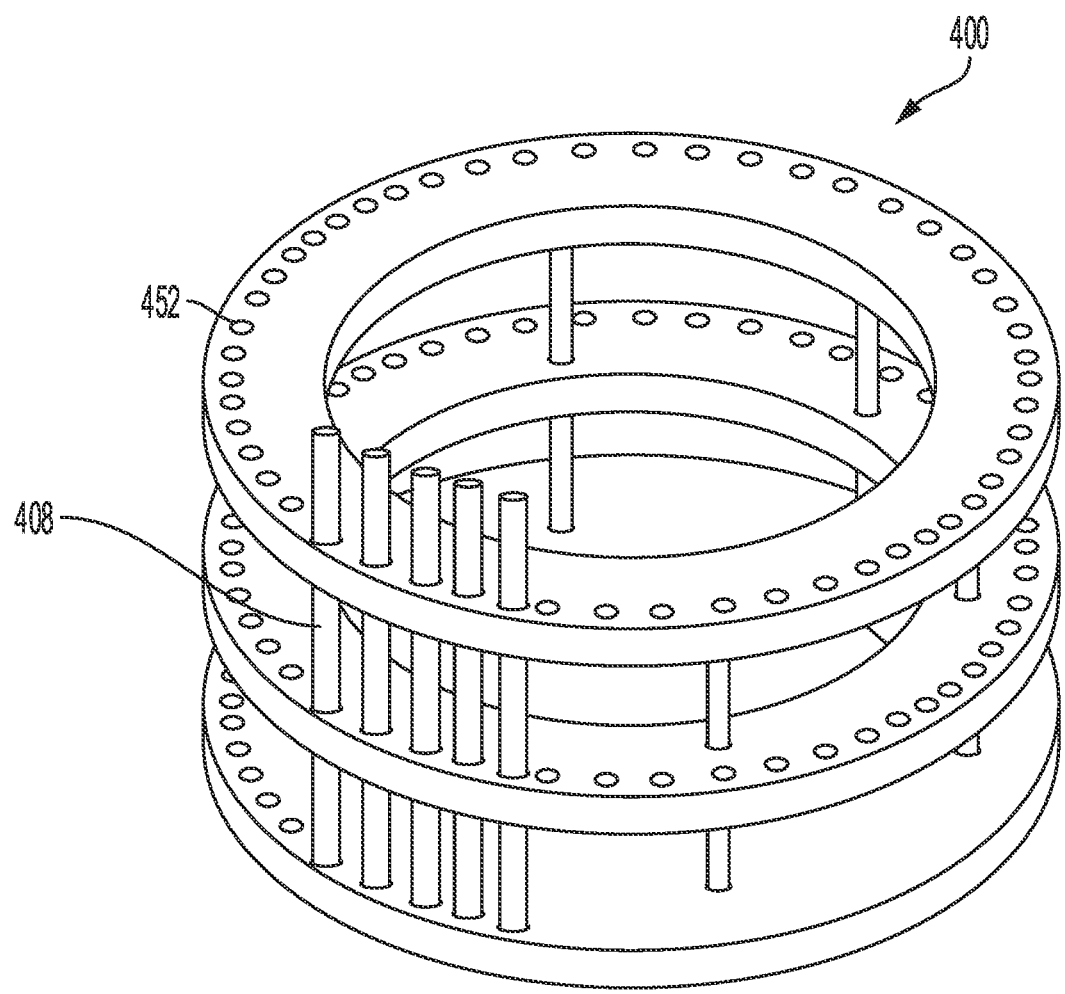
FIG. 8 shows a capsule storage cage for an extracted burnable absorber capsule comprising a plurality of burnable absorber capsules and a plurality of vacant storage slots, in accordance with at least one aspect of the present disclosure.

FIG. 8 shows a capsule storage cage 400 for an extracted BA capsule comprising a plurality of BA capsules 408 and a plurality of vacant storage slots 450, in accordance with at least one aspect of the present disclosure. The dimensions of the vacant storage slots 450 correspond to the dimensions of the BA capsules. For example, the dimensions of the vacant storage slot may be configured to accommodate an AC339 capsule. In an aspect, a BA rodlet is positioned above the next available vacant storage slot 450 and the BA capsule closest to the bottom of the BA rodlet is moved into the vacant slot with the assistance of the BA capsule removal module.

Various aspects of the subject matter described herein are set out in the following numbered examples:

Example 1

An apparatus for removing irradiated burnable absorber (BA) capsules, the apparatus comprising: a control arm; a BA capsule removal module supported by the control arm and positionable by the control arm around a BA rodlet, wherein the BA rodlet comprises a paramagnetic cladding material disposed about an outer surface of the BA rodlet; wherein the BA capsule removal module defines a capsule removal tunnel configured to be slidably positioned around a BA rodlet wherein the capsule removal tunnel defines first and second tunnel openings at corresponding first and second ends of the capsule removal tunnel, and wherein the first and second tunnel openings define a distal radius $R_1$ that linearly tapers to a smaller inner radius $R_2$; wherein the BA capsule removal module comprises: a plurality of bearing columns equidistantly spaced in the capsule removal tunnel, wherein the bearing columns comprise bearings configured to contact a BA rodlet positioned inside the capsule removal tunnel, and wherein the capsule removal module is slidably movable along a longitudinal axis of by the BA rodlet; and a solenoid positioned around the capsule removal tunnel and configured to electrically induce an electromagnetic flux in a BA capsule comprising a ferromagnetic material, wherein the electromagnetic flux locks the ferromagnetic BA capsule to the BA capsule removal module, wherein axial movement of the BA capsule removal module positioned outside of the BA rodlet results in the axial movement of the BA capsule inside of the BA rodlet.

Example 2

The apparatus for removing irradiated burnable absorber (BA) capsules of Example 1, wherein the plurality of bearing columns comprises at least three columns equidistantly spaced within the capsule removal tunnel, and wherein the plurality of bearing columns are configured to position the BA rodlet in the center of the capsule removal tunnel along the longitudinal axis.

Example 3

The apparatus for removing irradiated burnable absorber (BA) capsules of Example 1, wherein the BA capsule removal module is configured to remove the BA capsules from the plurality of BA rodlets submersed in a spent rod pool.

Example 4

The apparatus for removing irradiated burnable absorber (BA) capsules of Example 1, wherein the control circuit is configured to provide control commands to the BA capsule removal module from outside of the spent rod pool.

Example 5

The apparatus for removing irradiated burnable absorber (BA) capsules of Example 4, wherein the control circuit is configured to position the BA capsule removal module relative to the BA rodlet.

Example 6

The apparatus for removing irradiated burnable absorber (BA) capsules of Example 4, wherein the control circuit is configured to send a command to the BA capsule removal module, and wherein the command induces an electromagnetic flux in a BA capsule.

Example 7

The apparatus for removing irradiated burnable absorber (BA) capsules of Example 6, wherein the control circuit receives a feedback response from the BA capsule removal module and uses the feedback response to modulate the current in the solenoid.

Example 8

The apparatus for removing irradiated burnable absorber (BA) capsules of Example 1, wherein the control circuit is manually operated by a technician.

Example 9

The apparatus for removing irradiated burnable absorber (BA) capsules of Example 1, wherein the control circuit is automatically operated by a processor, and wherein the processor automatically evaluates feedback responses from the BA capsule removal module.

Example 10

The apparatus for removing irradiated burnable absorber (BA) capsules of Example 1, wherein the burnable absorber material comprises Cobalt-60 isotopes.

Example 11

A method for removing irradiated burnable absorber capsules from a plurality of burnable absorber rodlets, the method comprising: securing, by a rodlet positioning module, a first burnable absorber (BA) rodlet to a rodlet positioning control arm, wherein the rodlet positioning module is supported by the rodlet positioning control arm; disconnecting, by a cutting module, the first BA rodlet from a burnable absorber assembly, wherein the burnable absorber assembly comprises the plurality of BA rodlets connected by a hold-down plate in a predetermined array, and wherein the cutting module is configured to cut the first BA rodlet at the point where it connects to the hold-down plate; positioning, by a BA capsule removal control arm, BA capsule removal module around the BA rodlet, wherein the BA capsule removal module is supported by the BA capsule removal control arm; selecting, by the BA capsule removal module, a first BA capsule for removal; inducing, by the BA capsule removal module, an electromagnetic flux into the first BA capsule comprising a ferromagnetic material, wherein the electromagnetic flux locks the first ferromagnetic BA capsule in parallel with the BA capsule removal module; leveraging, by the rodlet positioning module, the position of the BA rodlet relative to the BA capsule removal module, wherein the applied leverage by the rodlet positioning module allows the BA capsule removal module to move the BA capsule in along a longitudinal axis; aligning, by the rodlet positioning module, the position of the BA rodlet over a first vacant storage slot in a capsule storage cage; and depositing, by the capsule removal module, the BA capsule into the first vacant storage slot of the capsule storage cage.

Example 12

The method for removing irradiated burnable absorber capsules from a plurality of burnable absorber rodlets of Example 11, wherein the plurality of BA rodlets comprise a paramagnetic cladding material disposed about an outer surface of the BA rodlet.

Example 13

The method for removing irradiated burnable absorber capsules from a plurality of burnable absorber rodlets of Example 11, wherein the plurality of BA rodlets comprise a superparamagnetic cladding material disposed about an outer surface of the BA rodlet.

Example 14

The method for removing irradiated burnable absorber capsules from a plurality of burnable absorber rodlets of Example 11, wherein the control circuit is manually operated by a technician.

Example 15

The method for removing irradiated burnable absorber capsules from a plurality of burnable absorber rodlets of Example 11, wherein the control circuit is automatically operated by a processor, and wherein the processor automatically evaluates feedback responses from the BA capsule removal module, rodlet positioning module, and the cutting module.

Example 16

The method for removing irradiated burnable absorber capsules from a plurality of burnable absorber rodlets of Example 11, wherein the burnable absorber material comprises Cobalt-60 isotopes.

Example 17

A system for removing irradiated burnable absorber (BA) capsules from a plurality of burnable absorber rodlets, the system comprising: a control circuit communicably coupled to a rodlet positioning module, a cutting module, and one or more BA capsule removal modules; the control circuit comprises at least one processor, and configured to: secure, by the rodlet positioning module, a first BA rodlet to the rodlet positioning module; position, a first BA capsule removal module around the BA rodlet; remove, by the cutting module, the first BA rodlet from a BA assembly, wherein the first BA rodlet comprises a plurality of BA capsules; select, by the first BA capsule removal module, a first BA capsule from a plurality of BA capsules; induce, by the first BA capsule removal module, an electromagnetic flux into the first BA capsule comprising a ferromagnetic material, wherein the electromagnetic flux locks the first ferromagnetic BA capsule in parallel with the first BA capsule removal module; remove, by the cutting module, a bullet nose plug from the first BA rodlet; leverage, by the rodlet positioning module, the position of the first BA rodlet relative to the first BA capsule removal module, wherein the applied leverage by the rodlet positioning module allows the first BA capsule removal module to move the first BA capsule in along a longitudinal axis; align, by the rodlet positioning module, the first BA rodlet over a first vacant storage slot in a capsule storage cage; and deposit, by the first BA capsule removal module, the first BA capsule into the first vacant storage slot of the capsule storage cage.

Example 18

The system for removing irradiated burnable absorber (BA) capsules from a plurality of burnable absorber rodlets of Example 17, wherein the plurality of BA rodlets comprise a superparamagnetic cladding material disposed about an outer surface of the BA rodlet.

Example 19

The system for removing irradiated burnable absorber (BA) capsules from a plurality of burnable absorber rodlets of Example 17, wherein the plurality of BA rodlets comprise a paramagnetic cladding material disposed about an outer surface of the BA rodlet.

Example 20

The system for removing irradiated burnable absorber (BA) capsules from a plurality of burnable absorber rodlets of Example 17, wherein the control circuit is manually operated by a technician.

Example 21

The system for removing irradiated burnable absorber (BA) capsules from a plurality of burnable absorber rodlets of Example 17, wherein the control circuit autonomously provides instructions to the first BA capsule removal module, rodlet positioning module, and the cutting module without human intervention, and wherein the control circuit automatically evaluates feedback responses from the first BA capsule removal module, rodlet positioning module, and the cutting module.

Example 22

The system for removing irradiated burnable absorber (BA) capsules from a plurality of burnable absorber rodlets of Example 17, wherein the burnable absorber material comprises Cobalt-60 isotopes.

Example 23

The system for removing irradiated burnable absorber (BA) capsules from a plurality of burnable absorber rodlets of Example 17 further comprises: a second BA capsule removal module communicably coupled to the control circuit; the control circuit is configured to: select, by the second BA capsule removal module, a second BA capsule from a plurality of BA capsules, and induce an electromagnetic flux into the second BA capsule, and wherein control circuit transitions the movement control of the second BA capsule from the second capsule removal module to the first capsule removal module.

Numerous specific details are set forth to provide a thorough understanding of the overall structure, function, manufacture, and use of the aspects as described in the present disclosure and illustrated in the accompanying drawings. Well-known operations, components, and elements have not been described in detail so as not to obscure the aspects described in the present disclosure. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the present disclosure, like reference characters designate like or corresponding parts throughout the several views of the drawings.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various examples and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the example aspects may be made without departing from the scope of the invention. In addition, persons skilled in the art will recognize, or be able to ascertain using no more than routine experimentation, many equivalents to the various aspects of the invention described herein upon review of the present disclosure. Thus, the present disclosure is not limited by the description of the various aspects, but rather by the claims.

It should further be noted that the implementations of the control circuit 220 described above are merely for illustrative purposes and should not be interpreted to be limiting in any way. The control circuit 220 can be utilized in a variety of different processing contexts.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), such as floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, quantum processors, spiking network hardware, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of RAM), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to,"

"related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the present disclosure are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In the present disclosure, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in the present disclosure is intended to include all lower numerical limitations subsumed therein, and any minimum numerical limitation recited in the present disclosure is intended to include all higher numerical limitations subsumed therein. Accordingly, Applicant reserves the right to amend the present disclosure, including the claims, to expressly recite any sub-range subsumed within the ranges expressly recited. All such ranges are inherently described in the present disclosure.

Any patent application, patent, non-patent publication, or other disclosure material referred to in the present disclosure and/or listed in any Application Data Sheet is incorporated by reference herein, to the extent that the incorporated materials is not inconstant herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method for removing irradiated burnable absorber capsules from a plurality of burnable absorber rodlets, the method comprising:
   securing, by a rodlet positioning module, a first burnable absorber (BA) rodlet to a rodlet positioning control arm, wherein the rodlet positioning module is supported by the rodlet positioning control arm;
   disconnecting, by a cutting module, the first BA rodlet from a burnable absorber assembly, wherein the burnable absorber assembly comprises the plurality of BA rodlets connected by a hold-down plate in an array, and wherein the cutting module is configured to cut the first BA rodlet from the hold-down plate;
   positioning, by a BA capsule removal control arm, a BA capsule removal module around the first BA rodlet, wherein the BA capsule removal module is supported by the BA capsule removal control arm;
   selecting, by the BA capsule removal module, a first BA capsule of the first BA rodlet for removal, the first BA capsule comprises a ferromagnetic material;
   inducing, by the BA capsule removal module, an electromagnetic flux into the first BA capsule, wherein the electromagnetic flux magnetically locks the first BA capsule in parallel with the BA capsule removal module;
   leveraging, by the rodlet positioning module, the position of the first BA rodlet relative to the BA capsule removal module, wherein the applied leverage by the rodlet positioning module allows the BA capsule removal module to move the first BA capsule along a longitudinal axis of the first BA rodlet;

aligning, by the rodlet positioning module, the position of the first BA rodlet over a first vacant storage slot in a capsule storage cage; and depositing, by the BA capsule removal module, the BA capsule into the first vacant storage slot of the capsule storage cage.

2. The method for removing irradiated burnable absorber capsules from a plurality of burnable absorber rodlets of claim 1, wherein the plurality of BA rodlets comprise a paramagnetic cladding material disposed about an outer surface of each BA rodlet of the plurality of BA rodlets.

3. The method for removing irradiated burnable absorber capsules from a plurality of burnable absorber rodlets of claim 1, wherein the plurality of BA rodlets comprise a superparamagnetic cladding material disposed about an outer surface of each BA rodlet of the plurality of BA rodlets.

4. The method for removing irradiated burnable absorber capsules from a plurality of burnable absorber rodlets of claim 1, further comprising controlling the BA capsule removal module by way of a control circuit, wherein the control circuit is manually operated by a technician.

5. The method for removing irradiated burnable absorber capsules from a plurality of burnable absorber rodlets of claim 1, further comprising controlling the BA capsule removal module by way of a control circuit, wherein the control circuit is automatically operated by a processor, and wherein the processor automatically evaluates feedback responses from the BA capsule removal module, the rodlet positioning module, and the cutting module.

6. The method for removing irradiated burnable absorber capsules from a plurality of burnable absorber rodlets of claim 1, wherein the first BA capsule comprises Cobalt-60 isotopes.

* * * * *